(12) United States Patent
Chambers (10) Patent No.: US 8,919,285 B1
(45) Date of Patent: Dec. 30, 2014

(54) PORTABLE LIVESTOCK FEED STORAGE AND DELIVERY DEVICE

(71) Applicant: Greg Chambers, Booneville, MS (US)

(72) Inventor: Greg Chambers, Booneville, MS (US)

( * ) Notice: Subject to any disclaimer, the term of this patent is extended or adjusted under 35 U.S.C. 154(b) by 35 days.

(21) Appl. No.: 13/624,414

(22) Filed: Sep. 21, 2012

(51) Int. Cl.
*A01K 5/00* (2006.01)
*A01K 5/02* (2006.01)

(52) U.S. Cl.
CPC ..................... *A01K 5/0258* (2013.01)
USPC ...................................... 119/57.92

(58) Field of Classification Search
CPC .... A01K 5/002; A01K 5/0275; A01K 5/0258
USPC ................. 119/52.1, 52, 53, 56.1, 56.2, 57.5, 119/57.92, 61.1, 61.2; 366/132, 603
See application file for complete search history.

(56) References Cited

U.S. PATENT DOCUMENTS

| | | | | |
|---|---|---|---|---|
| 941,767 A | * | 11/1909 | Dickson | 165/76 |
| 4,330,091 A | * | 5/1982 | Rozeboom et al. | 241/73 |
| 4,664,527 A | * | 5/1987 | Schuler | 366/141 |
| 4,707,140 A | * | 11/1987 | Mohrlang | 366/186 |
| 4,712,922 A | * | 12/1987 | Feterl | 366/288 |
| 4,797,004 A | * | 1/1989 | Buschbom | 366/186 |
| 4,799,800 A | * | 1/1989 | Schuler | 366/296 |
| 4,974,548 A | * | 12/1990 | Lynch | 119/56.1 |
| 5,505,542 A | * | 4/1996 | Braeker et al. | 366/299 |

* cited by examiner

*Primary Examiner* — Rob Swiatek
*Assistant Examiner* — Ebony Evans (57) ABSTRACT

A new device for the collection, storage, and selected delivery of livestock feed is provided. Such a device includes an internal system to simultaneously prevent caking or otherwise solidifying of such feed material as well as maneuver the same to a trough for dispensing on demand. Additionally, the device includes an auger component with a housing cap to selectively alter the rate of dispensing as well as provide a shut off mechanism if needed. Such a device thus may be driven to a feed source location and filled to any selected level, closed, and transported to any desired location to permit delivery thereof the stored feed. With the enclosed structure, as well, long-term storage may be achieved, thus effectively preventing rodent or other pest invasion, as well as providing a suitable moisture barrier for proper and effective storage. A system of feeding livestock with this device is also encompassed.

12 Claims, 9 Drawing Sheets

SECTION A-A
FIG. 4

PORTABLE LIVESTOCK FEED STORAGE AND DELIVERY DEVICE

FIELD OF THE INVENTION

This invention pertains to a new device for the collection, storage, and selected delivery of livestock feed. Such a device includes an internal system to simultaneously prevent caking or otherwise solidifying of such feed material as well as maneuver the same to a trough for dispensing on demand. Additionally, the device includes an auger component with a housing cap to selectively alter the rate of dispensing as well as provide a shut off mechanism if needed. Such a device thus may be driven to a feed source location and filled to any selected level, closed, and transported to any desired location to permit delivery thereof the stored feed. With the enclosed structure, as well, long-term storage may be achieved, thus effectively preventing rodent or other pest invasion, as well as providing a suitable moisture barrier for proper and effective storage. The system of such collection, storage, and delivery is also encompassed within the invention.

BACKGROUND OF THE INVENTION

Livestock maintenance has proven to be a difficult issue to handle. In particular, the need to provide sufficient nourishment to cattle and other livestock animals in a safe, reliable, and secure manner has always required a certain degree of attention that could be better spent in other areas. Generally, livestock owners will not provide their own feed for such animals, but must purchase such materials from a co-op or other farm location situated a distance from their own land. As such, the need for reliable transport of such materials is of great importance since large amounts, dependent on the number of livestock animals involved, require significantly large tanks and thus vehicles for such an undertaking. Likewise, upon collection from the co-op location (or other like place), the feed materials are not only transported, but must be stored as well within a suitable environment to best prevent pests from entering and devouring the feed, as well as to prevent undesirable caking and hardening of such milled materials during storage. Temperature fluctuations during storage, as well as moisture levels may further complicate such matters, leading to feed spoilage or, as noted above, unwanted hardening, making the feed unfit for livestock consumption or difficult to remove from the storage tank or bin, itself. In any event, the ability to provide proper collection, transportation, and storage, at least, is very important in order to at least permit the livestock owner an efficient and cost-effective manner of providing feed materials to his or her animals on demand and in a safe manner.

Delivery, then, of such stored materials is another important issue. Dependent on the amount of feed materials collected and stored, the delivery may be of any portion on a daily basis from the stored supply. If the feed materials are stored in a tank assembly (or silo), removal and ultimate placement within a proper location (such as a feed trough) may be difficult to accomplish for a number of reasons. Again, hardening of the feed may prevent removal from the storage location and require excessive forces to be applied to properly loosen the feed materials prior to delivery. Furthermore, controlled delivery at a certain rate out of a tank or silo may be necessary to prevent waste of feed, too. Additionally, if the tank or silo are closed, knowledge of the actual amount of feed remaining may be hard to estimate in such a scenario.

As it is, such problems in the livestock feeding industry have not been of significant help. Placement in open-ended tanks that allow mixing of feed materials to form a final composition for delivery to cattle, pigs, horses, sheep, goats, and the like, have been proposed, but do not provide sufficient methods to prevent caking and hardening, ostensibly because of the direct delivery subsequent to mixing undertaken. Thus, long-term storage is not an issue for such devices. As well, tank vehicles have been disclosed that allow for a user to drive to a co-op or like location and have feed directly placed therein and then transported to a desired livestock feed location Such devices, however, do not provide hardening prevention components or methods, and delivery processes are limited to open augers that drive feed out of an opening via a trough within the tank. Such a device may permit a certain degree of control in delivery, but, as well, the open-ended auger structure does not provide a manner of controlled stoppage to prevent waste of excess feed if necessary. Nowhere, either, are there any concerns with moisture prevention or feed amount monitoring without actually opening the subject tank for empirical assessment.

In other words, there remains a significant need for improvements within the livestock feed delivery/storage/collection industry. A manner of providing an all-in-one device that allows for secure collection, sealed storage, caking prevention, pest elimination, moisture reduction, and effective controlled delivery on demand and at a specific selected location and rate has simply not been made available to livestock owners in the past.

Advantages and Summary of the Invention

A notable advantage of the inventive livestock feed collection, transport, storage, and delivery system is the capability of such a device to provide such functions in a single vessel. Another advantage is the ability for such a device to continuously prevent hardening and thus delivery problems with the bulk feed materials during storage. Yet another advantage is the capability of controlled delivery in tandem with the anti-caking mechanical components therein. Still another advantage of the inventive device is the ability to keep the feed materials introduced therein completely enclosed until delivery is performed, thus preventing any introduction of undesirable pests or moisture. As such, the overall device provides the further advantage of retaining feed materials in suitable delivery form for a longer period of time, as well as delivered through a process that best guarantees that the vast majority of subject bulk feed is transferred to livestock with minimal waste, thus making feed purchase and utilization by a livestock owner or caretaker to be highly cost-effective.

Accordingly, this invention encompasses a portable livestock feed delivery device, wherein said tank comprises a fully enclosable tank having a horizontally configured cylindrical shape with two closed parallel, vertical ends and internal and external portions, wherein said internal portion of said tank exhibits a top end and a bottom end, wherein said tank includes a hinged door at said top end that allows for entry of feed from an external source into said tank and includes a seal for moisture prevention when closed, wherein said tank further includes a trough present along said tank bottom portion, said trough extending to at least one of said closed, parallel, vertical ends of said tank and including mechanical means to move feed along said trough and to a point of egress present on said at least one parallel, vertical ends of said tank; wherein said tank further includes a mechanized scraping device that includes a plurality of curved structures along the length of said cylindrically shaped tank and disposed on either side of said trough, wherein said curved structures of said scraping device are aligned with the contours of said cylindrically shaped tank and are located at least 1 inch from the internal surface of said tank, and wherein said scraping device further includes components that direct feed toward said trough during utilization thereof. Also included within this invention is the same feed delivery device noted above wherein the trough component includes a means with which controlled introduction of feed materials into said trough is permitted. Furthermore, the invention encompasses the method of collecting, transporting, storing, and delivering feed materials therewith such a device to a specific location for livestock feeding to commence.

Such a unique device provides the aforementioned benefits of direct collection from a bulk feed source (such as a silo or supply station at a farm co-op or like location), sealed enclosure thereafter, transport from such a location to a livestock feeding station, long-term storage in an enclosed environment with lessened propensity for caking of the bulk feed stored therein, and then reliable direct delivery to a specific area (trough, bucket, etc.) on demand and at a rate that allows for proper control and shutdown if necessary. The inclusion of internal scraping devices, again, as noted above, permits effective movement throughout the stored bulk feed within the device in order to prevent cementation or caking while simultaneously directing certain portions of the bulk feed to the delivery component at the bottom of the device. In order to achieve such a simultaneously benefit, however, the scraping device must be configured properly to take the same general shape as the internal sides of the feed holding tank, but situated a proper distance to allow for free movement of such a scraper away from the tank walls (the distance may be from about ½ inch to 4 inches, generally, with about 1 inch potentially preferred). The scraping devices are preferably constructed of sufficiently strong materials to properly maneuver through feed without showing any appreciable level of breakage. Thus, metals, such as stainless steel, aluminum, and the like, that do not exhibit a propensity for rusting over time and when in contact with moisture potentially present within such feed during storage, are potentially preferred. Polymeric materials, including, without limitation, polyolefins (such as high density polyethylene and composites made from polypropylene), polyamides (nylon, for instance), thermosets (such as polyurethane), all as merely examples, may be utilized for such a purpose. The long posts thereof may be of one type of material with the diagonal cross ties made from another, as well. Connecting means, such as screws, brads, and the like, may be utilized, as well, for cross tie/long post attachments, with such connection means implemented through openings large enough within such cross ties and long posts to permit rotation therein for free movement of the posts and ties during use to scrape and deliver the feed materials as described herein.

Such a scraping device is preferably configured in a manner wherein a midpoint within the feed tank creates a specific location for a symmetric structure moving in opposing relation to the other is provided. In other words, the scraping device includes four separate components all having the same structure and configuration. One component would be aligned with half of the feed tank at one side of the cylindrical shape thereof and perpendicular to the parallel, vertical ends. Another will be disposed on the opposite side of the same half of the feed tank, but curving in the opposite direction of the first component. Thus, the remaining two will be similarly configured, but opposite in direction from the first two components. In this manner, each pair of components of the scraping device present on a single half of the feed tank (again, disposed perpendicularly to the parallel, vertical ends thereof), will move in an opposite direction from the other pair of components. With a scraping direction for such components aligned substantially perpendicularly to the vertical ends of the tank, one pair will move forward in its direction toward the midpoint of the tank while the other pair will move forward in its direction toward the same midpoint, thus effectuating an opposing directional flow of the feed during movement thereof of such a scraping device. As such, then, when one pair of components is moving away from its midpoint direction, the other pair does the same, thus, again, moving opposite of one another. This concerted movement is imperative to achieve the necessary feed circulation to prevent caking and to direct the feed downward to the trough located at the bottom and aligned in the same direction as the scraping device components.

In order to prevent caking, cementation, and the like, within the central areas of the tank, a further spinning device with staggered posts present thereon and disposed lengthwise between the two parallel sides thereof, may be utilized as well. Such a device may be manually or remotely controlled (electronically) and through rotation of the posts disposed within the tank, breaks up any coagulated feed and aids to control the direction of the feed materials toward the trough component, too. If desired, more than one such device may be employed as long as such devices do not obstruct the movement of the side wall scraping devices or any other mechanical component present within the internal portion of the tank.

Thus, additionally, the device includes a trough in the bottom portion thereof to collect feed and to direct a metered amount therein and to a point of egress disposed within one of the parallel, vertical ends of the tank. The trough would include a proper mechanical means itself to effectively maneuver the bulk feed directed thereto by the scraping device (as well as through gravitational and possibly cohesive forces, particularly when the supply of feed is reduced to a point that contact with the scraping device is minimal) and along the length of such a trough to a point of egress whereupon a user may collect the stored feed for dispensing to livestock. The trough itself is configured to receive such bulk feed at any point therein in one potentially preferred configuration, as well as at selected locations in another potentially preferred configuration. Such differing configurations allow for proper control of bulk feed flow, as well as shutdown of the delivery device thereof, if necessary, in order to limit the potential for waste during dispensing. The first potentially preferred configuration provides for a suitable inclined cap to be placed over the trough itself. Such a cap is symmetrical in shape and provides for even distribution over both sides of the trough itself. Thus, the cap runs the length of the trough within the bottom of the feed tank and appears as a properly inclined roof. Additionally, however, this cap is outfitted with a control mechanism that permits the user to raise and lower such a cap on demand in order to permit an increase or decrease in the amount of bulk feed introduced within the trough during use. As well, such a cap may be lowered to completely cut off all feed supply to the trough, thus allowing for shutdown of delivery of bulk feed if necessary. The inclined shape and symmetrical shape thereof is vitally important to decrease the chances of feed residue from collecting on top of such a cap. Such an incline shape may be provided through the structure of the cap itself, or, alternatively, a hinge may be incorporated within the exact midline of such a cap (along the trough direction) to fold appropriately when lifted and lowered to cover the trough as needed. Coupled with gravitational forces and cohesion between feed materials, the likelihood of residual feed collecting within the tank is greatly minimized, if not eliminated. In this manner, then, the potential for complete removal of stored feed from such an overall device gives greater reliability that older feed that may contaminate newer materials will not be present in an appreciable amount, thereby reducing the necessity for thorough cleaning of the tank between collection and storage procedures.

The other potentially preferred configuration of the trough is through a staggered opening design between the tank and the trough located in the tank bottom. In such a situation, discrete openings in the tank bottom leading to the trough may be incorporated therein that allow for certain amounts of feed to pass through at certain times. Additionally, however, a movable plate with openings that correlate to those within the tank floor is disposed underneath the tank floor and above the trough in the tank bottom. The user may then manually (or mechanically, as the case may be) adjust the size of the openings leading to the trough through movement of the movable plate externally. As well, then, the alignment of such a plate to a location that completely prevents movement of feed from the tank through to the trough, thereby effectuating complete shutdown on demand of feed delivery to the trough if necessary. Likewise, as above, a user may manipulate and maneuver all internally located feed materials through the openings thereof with such a configuration through continuous movement of the plate for a short period of time. Thus, reduction of potentially contaminating older feed material residue within the tank is provided with this alternative configuration as well. Thus, with this configuration, selected points of introduction (through the openings within the tank floor and the movable plate) of the feed materials into the trough are permitted; with the first configuration, noted above, with the inclined cap, feed materials are maneuvered into the trough portion at any point.

The trough thus includes a mechanical means to maneuver feed materials along its length (from whatever point of introduction the feed materials enter the trough) to a point of egress at one of the parallel, vertical walls of the cylindrically shaped tank. Such a mechanical means may be of any suitable type for such a purpose, but preferably is an auger design. Such a structure is basically a spirally or helically shaped screw-type device that turns constantly (upon application of suitable power for such a purpose) within the confines of the trough and carries feed along its flights in a metered manner to the egress point. With loose feed materials provided through the scraping action of the scraping device within the tank, such materials are easily transported in such a manner.

The egress point of the tank from which the feed materials are dispensed through manipulation out of the trough component may be of any type suitable for such a purpose. The tank may include a spout that may include a valve that stops further dispensing on demand with such a spout of proper size and configuration for introduction of feed into an external trough or other collection device (such as a bucket, pail, etc.). Likewise, the tank may include a suitable slide device to deliver such feed materials directly to a selected location and potentially through manipulation along a trough without excessive collection in one specific location therein. In other words, the egress component from the trough and thus from the tank may be of any type that allows for metered dispensing of such bulk feed.

In addition to such base components, the inventive device may also include a number of other items that provide further benefits to the overall procedures contemplated therewith. The sealed door located in the top of the tank may further include a pocket or other type of attachment device to permit introduction of a dessicant during storage. Thus packets of silica gel, or other like materials, may be securely placed within such a door attachment in order to permit moisture removal from the feed materials during storage. Furthermore, in order to allow for complete enclosure of the feed materials from collection to actual dispensing, the tank device may be outfitted with at least one window component that permits viewing of the level of feed materials present therein. Such a window may be made of a suitable transparent material (such as polyacrylate, plexiglas, and the like) that accords a very strong, sealed component for moisture barrier purposes while allowing monitoring of the feed material level therein. Alternatively, the tank may also be outfitted with a weight measuring device as an indicator of the amount of feed materials present therein, as well. Basically, the utilization of moisture seals, dessicant substances, and material amount monitoring devices, a user may avoid any need to open the feed tank for any reason until a new supply is needed. Thus, coupled with the other base components described above, rodents and other pests (insects, for instance) may be properly thwarted from entering the sealed feed tank, proper delivery of bulk feed materials may be permitted, and the user can reliably collect and store such valuable feed as needed.

Additionally, if needed, the tank device may include a proper thermostat and cooling/heating device to control temperature if needed. As well, humidifying or dehumidifying devices may be incorporated as well to control moisture levels, particularly in dry or humid areas.

The device may be utilized in a trailer-like form or may be incorporated as a part of motorized vehicle itself.

The scraping device may be controlled through manual means or through an electronic or mechanical manner. The inclined cap or movable plate portion may be effectuated in the same way, as may be the trough delivery means (auger, for instance) and egress portion (spout, etc.). The important issues are the juxtaposed scraping devices within the tank and the controlled delivery trough component, coupled with the sealed door.

BRIEF DESCRIPTION OF THE DRAWINGS

The following drawings are submitted with this utility patent application.

DETAILED DESCRIPTION OF THE DRAWINGS AND PREFERRED EMBODIMENTS

The drawings herein are not intended to provide any limitation as to the breadth and scope of the inventive device, but merely depict potentially preferred embodiments thereof.

Figure 1:
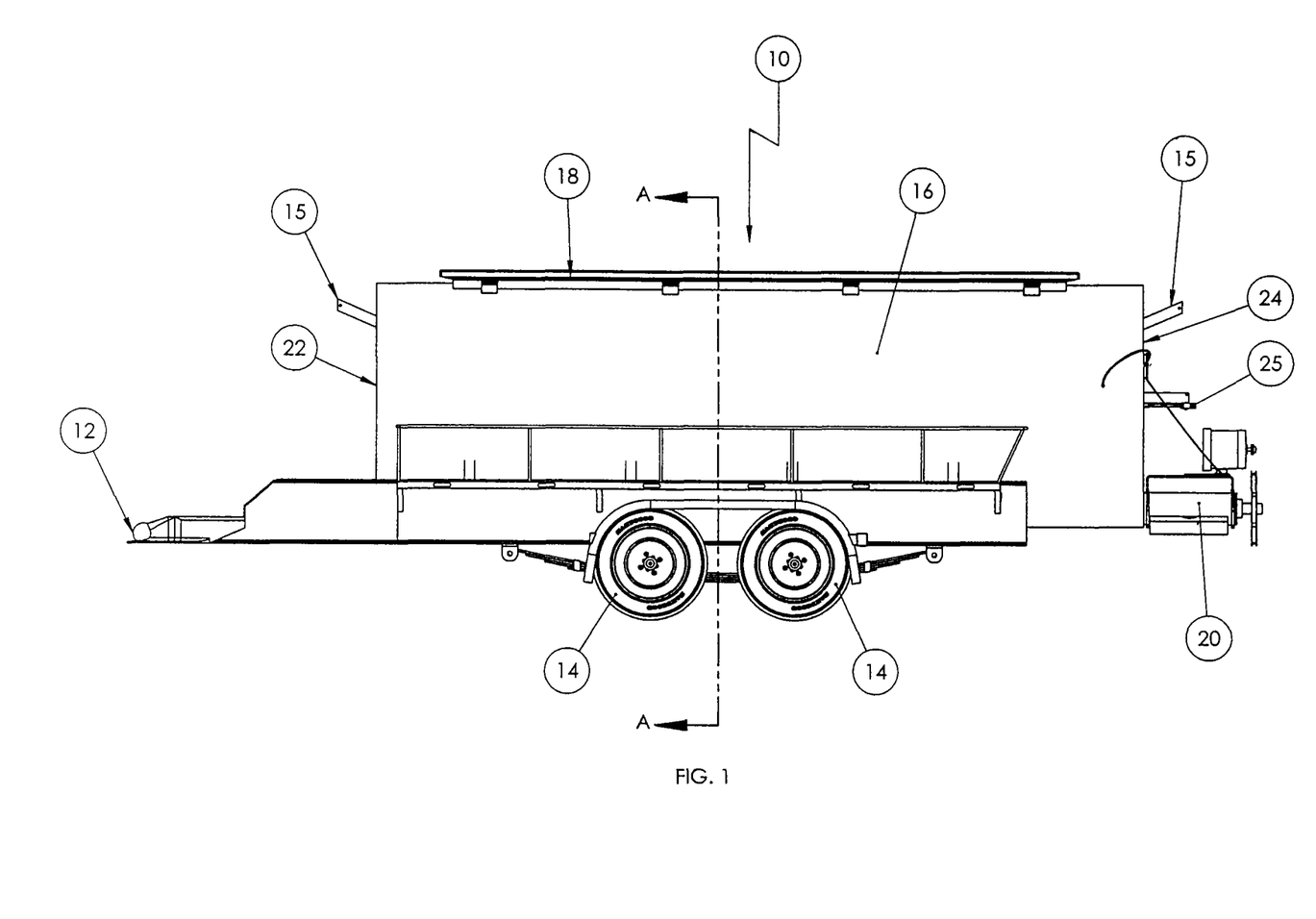
FIG. 1 is a side perspective view of one potentially preferred embodiment of the inventive livestock feeding apparatus.

FIG. 1 shows a vehicle-based livestock feeding device 10 with a truck cab 12 to house a driver that may transport the device 10 to a supply tank (not illustrated) and then to any other suitable location, such as a farm, for instance (not illustrated). Thus, the vehicle includes four tires 14 for such a purpose, as well. The device 10 includes a cylindrical tank 16 including a top door 18 that is properly sealed to prevent moisture, pest, rodent, etc., ingress once it is closed. The device 10 further includes an egress point (here a spout) 20 for dispensing of feed materials (not illustrated) on demand. Such an egress point 20 is configured to prevent entry of moisture, pests, rodents, etc., as well. The cylindrical tank 16 is aligned with two vertical, parallel ends 22, 24, with the egress point 20 located at one such end 24. Extending from each parallel end 22, 24 is an external control 15 to activate a trough cover (32 in FIG. 2, for example). Also extending from the rear parallel end 24 is an external control 25 to activate ribbed scraping devices (40, 42, of FIG. 2).

Figure 2:
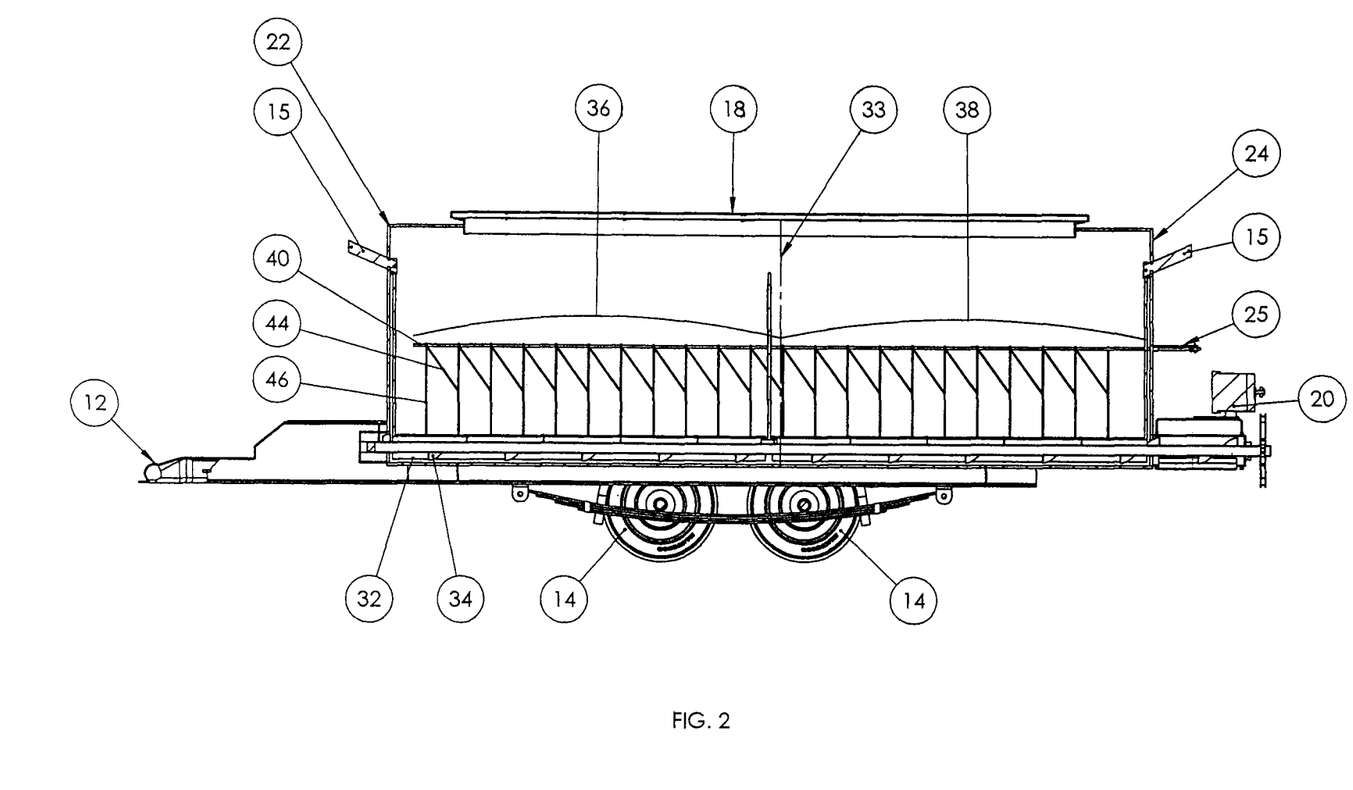
FIG. 2 is a side cross sectional view of the apparatus of FIG. 1.
Figure 3:
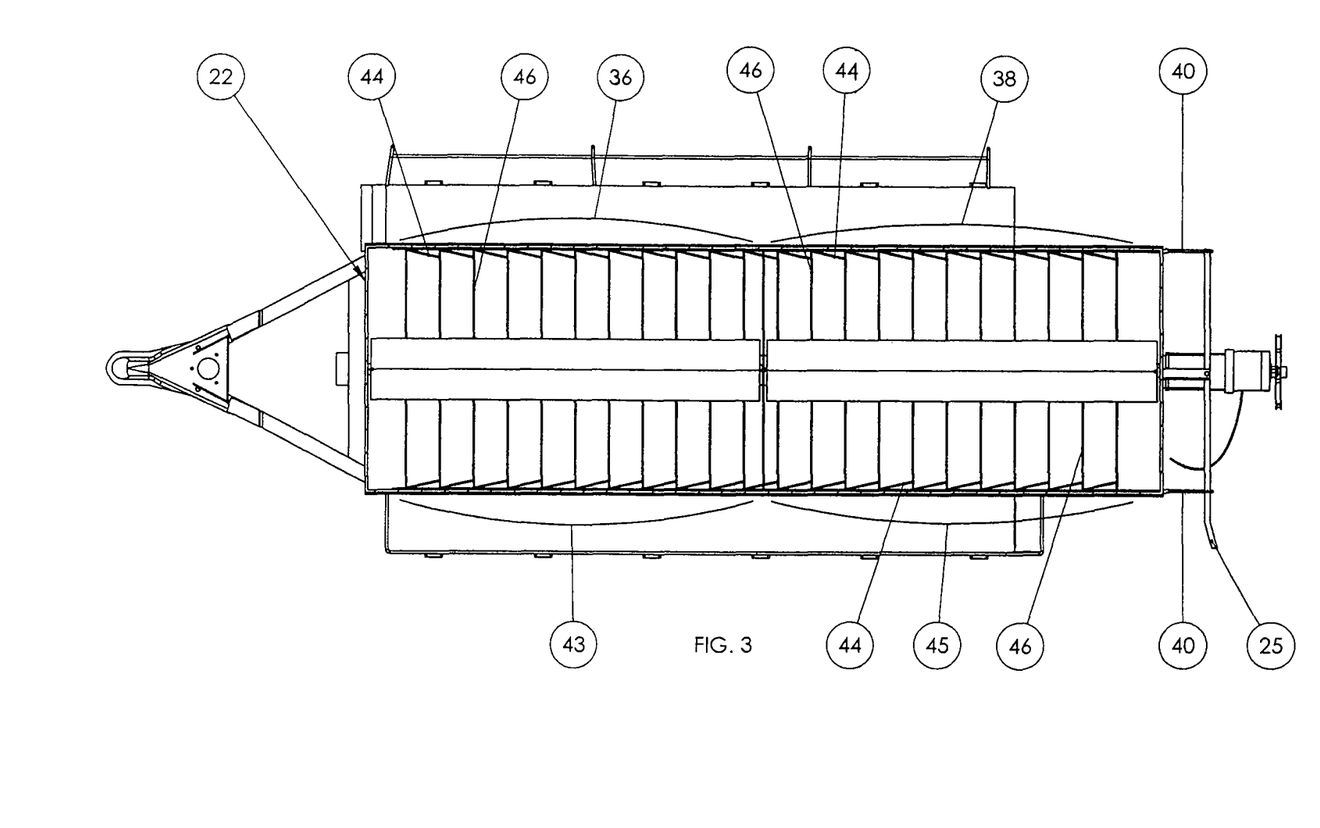
FIG. 3 is an aerial cross-sectional view of the apparatus of FIG. 1 showing the internal portion of the storage tank, following lines C-C'.
Figure 4:
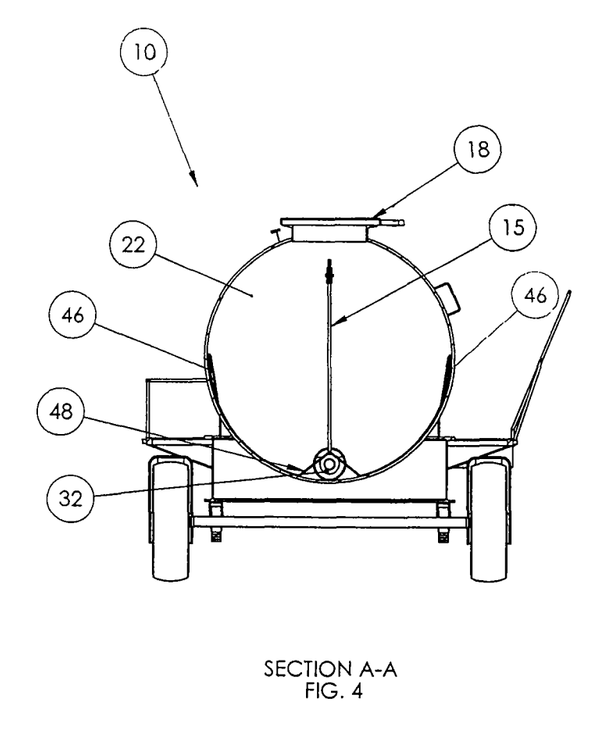
FIG. 4 is a cross-sectional view of the storage tank of the inventive apparatus of FIG. 1, following lines A-A'.

FIG. 2 depicts a cross-sectional view of the device 10 with the same tank 16, door 18, and egress point 20 as in FIG. 1. The door 18 includes seals 30 that allow for reliable sealed enclosure of bulk feed materials introduced therein (not illustrated) for moisture-, pest-, and rodent-free (at least) storage. The tank 16 has a trough 32 located at the bottom thereof that runs, in this embodiment, the length of the tank 16 from the truck wall 22 to the egress wall 24. Such a Included within the trough 32 is an auger 34 to direct feed materials (not illustrated) to the egress point 20 from within the tank 16. In this embodiment, the trough is covered by an inclined cap (cover) 48 (clearer in FIG. 4) that may be raised or lowered over the trough 32 and auger 34 by a user through a manual lever 15 located external of the egress wall 24. Such an inclined cap 48 may be configured with a hinge (such as a piano hinge, as one non-limiting example)(not illustrated) that adjusts upon manipulation up and down with the manual lever 15. Also included within the tank 16 are two sets of ribbed scraping devices 40, 42. Such devices 40, 42 include a plurality of curved long posts 46 and connecting arms 44 between each such post 46 and are attached to an external control 25 for manual activation thereof from outside the tank 10. These long posts 46 curve along in the same configuration as the tank walls (such as shown in FIG. 4 in greater detail). The connecting arms 44 allow for concerted movement between each post 46 within each separate device 36, 38. A base rod 37, 39 is provided for each separate device 36, 38 to provide a center location for movement initiation as well. The tank midpoint 33 creates a suitable separation point between the two scraping devices 36, 38 thus properly allowing for each device to move independently of the other. Provided as well, then, is a motorized (not illustrated) or manual control 25 that permits the user to initiate movement of the scraping devices 36, 38 with each base rod 37, 39 moving in an opposite direction from the other. FIG. 3 provides an aerial view of this embodiment showing the tank midpoint 33 and four distinct and separate scraping devices 36, 38, 43, 45, each with long posts 46, connecting arms 44, and separate base rods 37, 39, 47, 49. Upon activation of the manual or motorized control, the two devices 36, 43 on the right side of the trough 32, will move in the same direction, back-and-forth, and the two devices 38, 45, on the left side of the trough 32, will move in the same direction forth-and-back (opposite of the other two devices 36, 43). In this manner, with the curved configuration of the long posts 46 and, with the connecting arms 44, providing a ribbed configuration that permits movement and manipulation of feed materials (not illustrated) between the internal wall of the tank 16 and the scraping devices 36, 38, 43, 45, as well as between the long posts 46 and connecting arms 44, thereof, at least, the feed materials (not illustrated) are prevented from showing any appreciable level of cementation or caking during storage. Constant utilization and movement of such scraping devices 36, 38, 43, 45 should not be required during storage, but, at a minimum, activation of such devices 36, 38, 43, 45 4 times a day (every 6 hours for about 20-30 minutes, for example; any number and time period may be undertaken, however, if the user so desires, including constant movement during storage).

In addition to the benefits of anti-caking, etc., of the feed materials through the utilization of such scraping devices 36, 38, 43, 45, proper movement of feed materials (not illustrated) in a downward motion is permitted as well. The proper manipulation of such materials (not illustrated) in juxtaposed motion upon activation of the manual control 25 (in a back-and-forth motion, for instance) connected to the scraping devices 36, 38, 43, 45, described above, actually maneuvers such materials (not illustrated) into the trough 32. Coupled with movement of the auger 34 to remove such materials to the egress point 20, allows for continuous introduction of feed into the trough 32, as long as the auger is in motion and the egress point 20 allows dispensing. Thus, the scraping devices 36, 38, 43, 45, allow for effective movement of feed materials for proper delivery to the egress point 20 on demand. The absence of such devices 36, 38, 43, 45, or types that are not properly configured to the curvature of the tank walls 16 reduces not only the capability of anti-caking of feed materials, but also limits the manipulation potential downward of such feed to gravitational forces alone. Clogging and caking is inevitable in such circumstances, not to mention the eventual need to take sufficient time and expend resources and energy to decontaminate such a tank once the bulk feed has been substantially removed and dispensed. With the inventive device 10, such cost-effectiveness and efficiencies are prevalent as the internally configured and disposed scraping devices 36, 38, 43, 45, provide unexpectedly beneficial results through the removal of residual feed materials and prevention of caking thereof simultaneously.

FIG. 4 shows the cross-sectional view of the inventive device 10 with the inclined cap 48 in place over the trough 32 and auger 34. Such a cap 48 can be raised or lowered with a manual or motorized external control 15 attached to a lifting arm 17. In such a manner, the cap 48 may be adjusted to allow for greater or lesser amounts of feed to enter the trough 32 and thus be delivered to the egress point (20 of FIG. 3). As well, such a cap 48 may be lowered to the same level as the bottom of the tank 16 in order to prevent any further introduction of feed materials (not illustrated) into the trough 32. Such a configuration thus allows for immediate shutdown of the delivery process through the egress point (20 of FIG. 3) in order to ensure that, for example, any potential dispensing of materials into a location that is undesirable, or perhaps that may be spilling from a broken egress point (such as a broken spout, for instance)(20 of FIG. 3) may be permitted. The user may then fix the spout, or other type of dispenser, as needed with the device 10 prevented from allowing any further materials (not illustrated) to reach the egress point.

Figure 5:
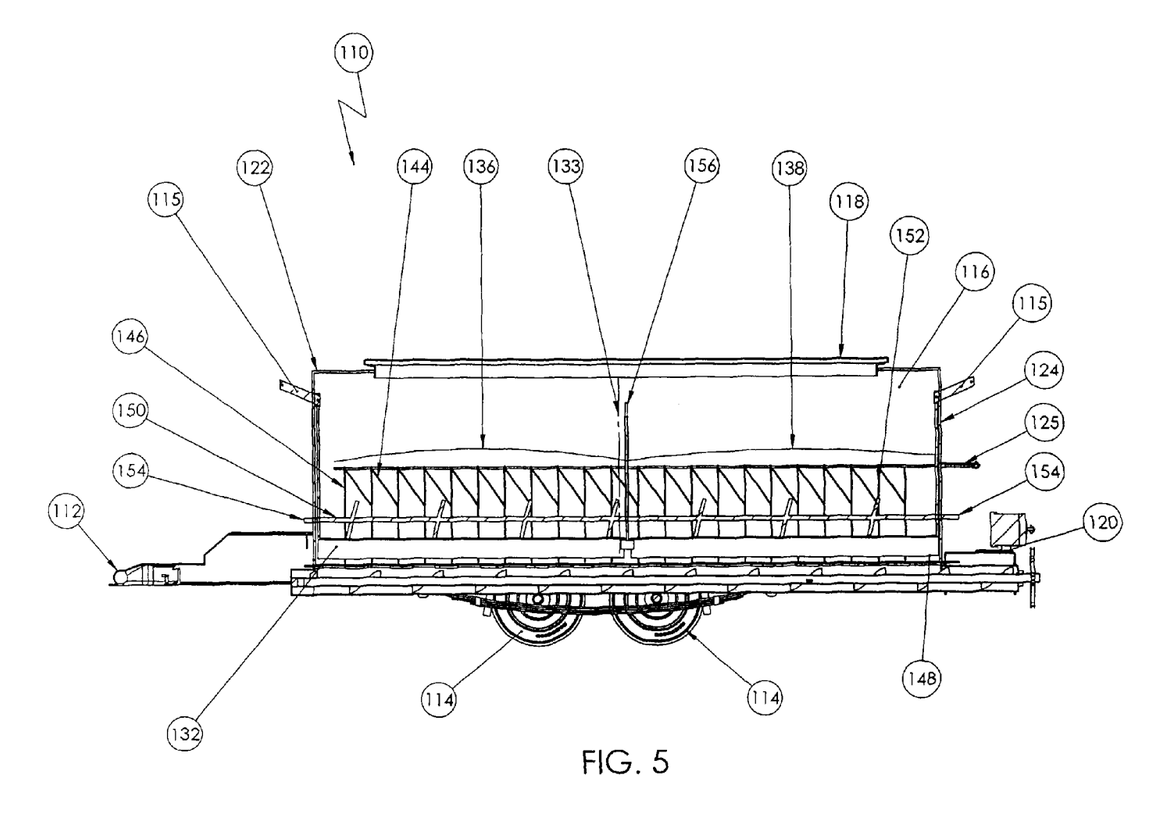
FIG. 5 is a cross-sectional view of one potentially preferred embodiment of the inventive livestock feeding apparatus including an internally situated anti-caking mechanism in addition to side situated mechanisms.
Figure 6:
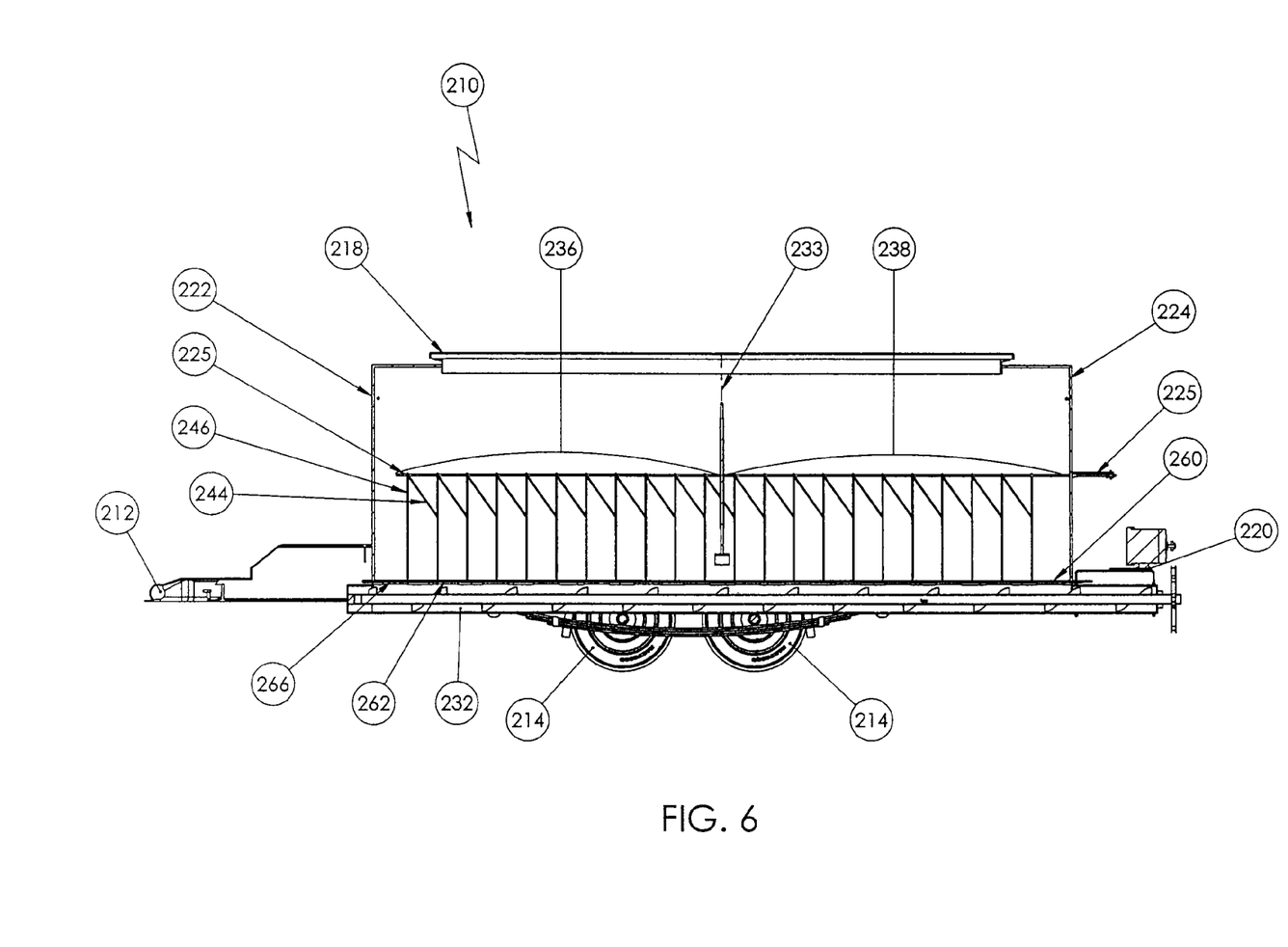
FIG. 6 is a side perspective view of another potentially preferred embodiment of the inventive livestock feeding apparatus including a bottom-disposed plate distribution component

FIG. 5 mirrors the device 110 presented within FIGS. 1-4, above, but with an internal spinning device 150 including a plurality of angled rotors 152 connected to exterior manual controls 154 to provide further capability of preventing undesirable feed cementation and/or caking when stored. The device 110 include a trailer component 112 and multiple wheels 114, with a tank 116 having parallel ends 122, 124. Within the tank 116 is a bottom-disposed trough 132 with an adjustable inclined cap 148, including an external control 115, as well as ribbed side-disposed scraping devices 136, 138 with a plurality of long posts 146 and diagonally placed cross arms 144, connected to its own external control 125, as well as an internal control 156. The tank midpoint 133 separates the two side-disposed scraping devices 136, 138, as well. A top sealed door 118 which may include a pocket or like structure for dessicant placement (not illustrated) is provided, too. The trough 132 leads to an egress spout 120 for feed delivery there from on demand.

FIGS. 6-9 thus show an alternate manner of providing effective device shutdown, if needed, while also allowing parsing delivery of materials into the trough 232 during dispensing. This alternate device 210 thus includes a tank floor 260 with a plurality of openings 262 of suitable size to be as wide as (or just a little narrower than) the width of the trough 232. A movable plate 266 including the same number of openings 262 as the tank floor 260, with the same length and width thereof, as well, is provided. Such a plate 266 may be adjusted horizontally along the length of the trough 232 such that movement the length of an opening 262 within the tank floor 260 allows for gradations in opening width for materials to pass from the tank 216 to the trough 232. As well, the plate 266 may be situated in closest relation to the exterior of the tank 216 such that complete closure of the tank floor openings 262 is achieved with the solid portions (not illustrated) of the plate 266 blocking any materials from moving into the trough 232, thereby allowing for shutdown of any dispensing of materials through the egress point 220 via the trough 232 and auger 234. Coupled with the scraping devices 236, 238, having similar long posts 246 and diagonal cross arms 244, the same type of feed material delivery may then be undertaken as for the embodiment in FIGS. 2, 3, and 4, above. A midpoint 233 of the tank 216 separates the scraping devices 236, 238, as above, and a sealed door 218 with alternate storage capacity of a dessicant or like material is provided, as well. The same type of trailer connection 212 and wheels 214 are present, too, for transport purposes.

Figure 7:
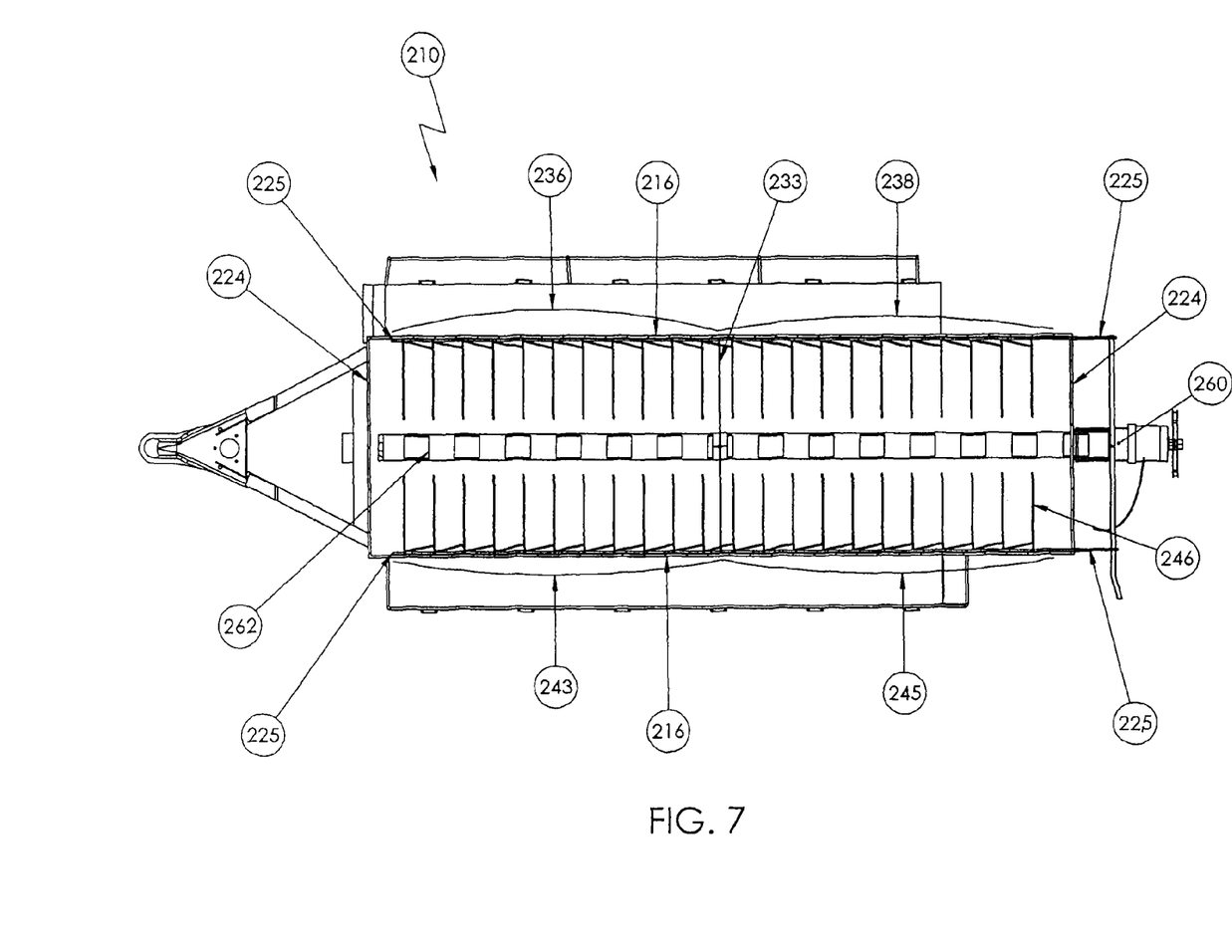
FIG. 7 is an aerial cross-sectional view of the apparatus of FIG. 6 showing the internal portion of the storage tank and the plate disposed to prevent movement of feed from the tank to the trough, following lines D-D'.
Figure 8:
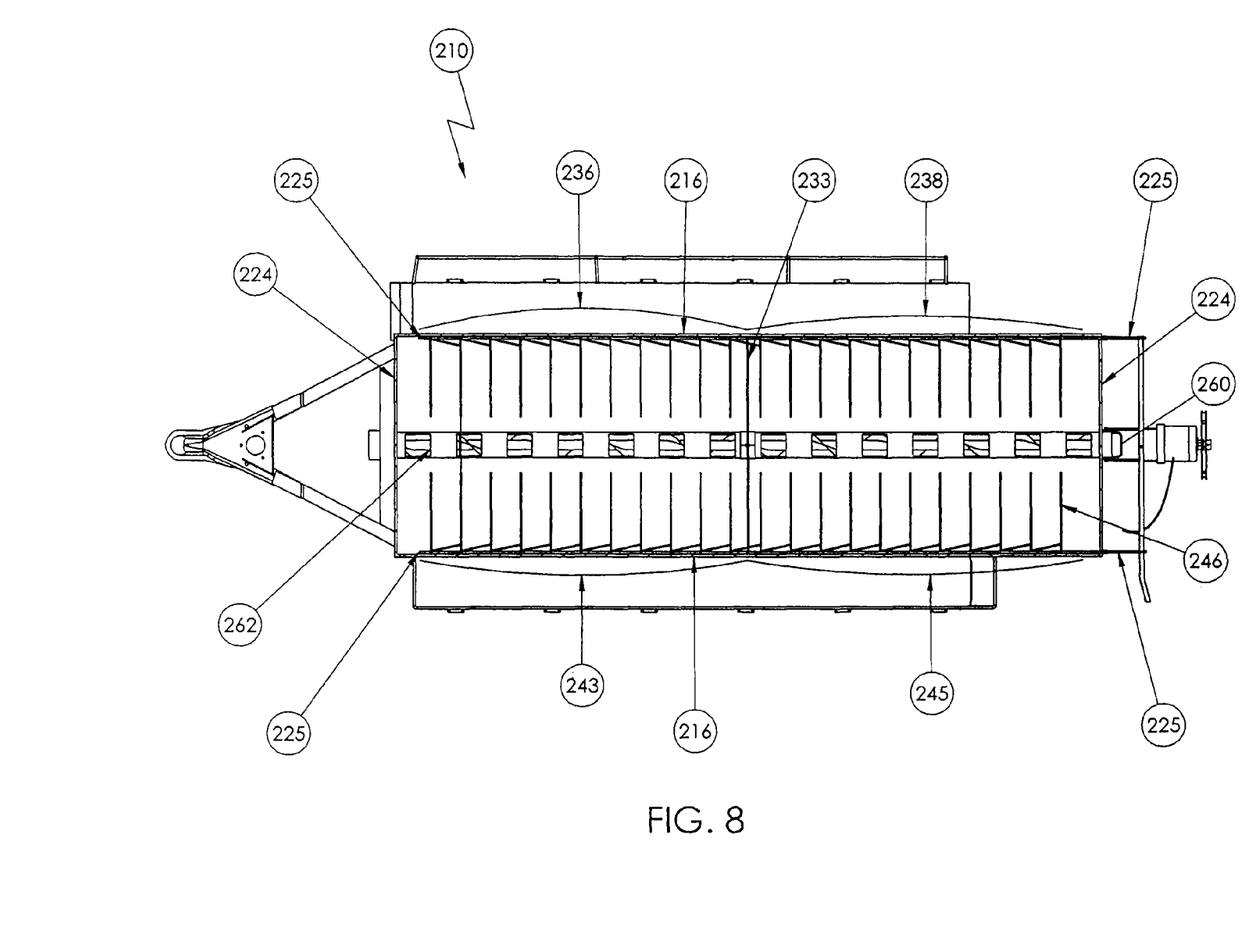
FIG. 8 is an aerial cross-sectional view of the apparatus of FIG. 6 with the plate disposed to permit movement of feed from the tank to the trough, following lines D-D'.

FIGS. 7 and 8 show the plate 260 in different phases, with FIG. 7 in closed state and FIG. 8 in open state. The side-disposed scraping devices 236, 238, 243, 245 thus prevent caking of feed (not illustrated) as well as aid in forcing such feed to the openings in the tank floor 262 and through the plate 260 into the trough (232 of FIGS. 6 and 9).

Figure 9:
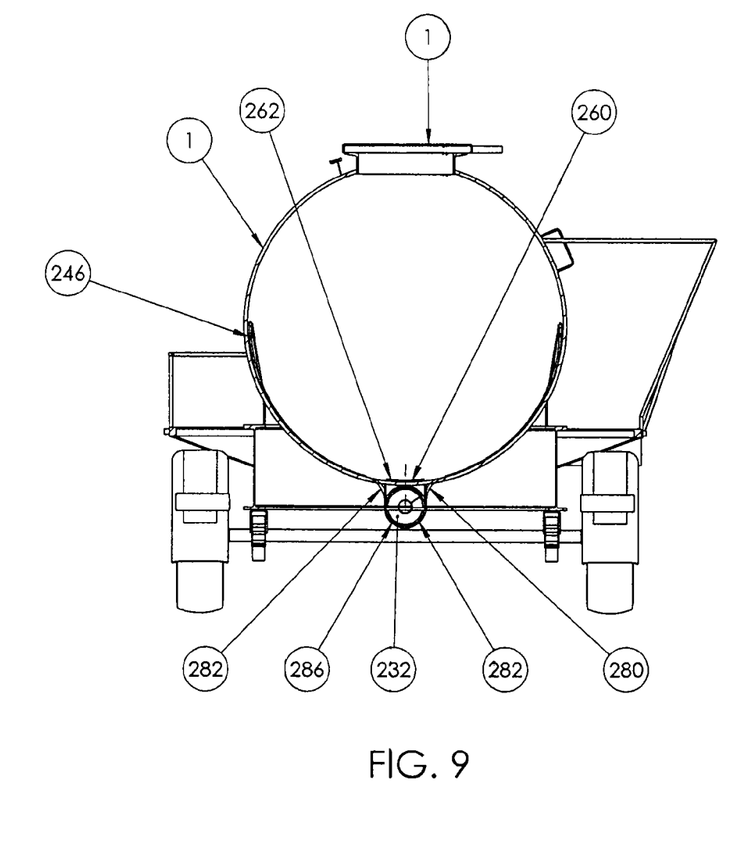
FIG. 9 is a cross-sectional view of the storage tank of the inventive apparatus of FIG. 6, following lines B-B'.

The cross-section view of FIG. 9 shows the inclined sides 280, 284 of the tank floor 262 in order to best assure feed movement in total from the tank 216 to the trough 232. The trough walls 282, 286 exhibit further angled disposition for such a purpose as well.

Thus, with this inventive livestock feed collection, transport, storage, and delivery device, a livestock owner, or other user, may have an all-in-one apparatus to make feeding livestock more efficient, more reliable, safer, and more cost-effective. The capability of providing an effective moisture, rodent and other pest barrier, to reduce feed loss and/or contamination, while also providing an effective means to prevent caking of feed during storage, metered delivery, and automatic shutdown if necessary, all with a transportable and manually or mechanically controlled system, has not been presented the livestock feeding industry until now.

While the inventive device has been particularly shown and described with reference to a preferred embodiment thereof, it will be understood by those skilled in the art that changes in form and detail may be made therein without departing from the spirit and scope of the invention.

I claim:

1. A portable livestock feed delivery device, wherein said device comprises a fully enclosable tank having a horizontally configured cylindrical shape, two vertical opposing parallel sides that define a length for said tank, an internal and external surface, a top being the highest point of the cylindrical shape and a bottom being the lowest point of the cylindrical shape, and a trough internally present along the bottom of said tank disposed lengthwise between said two opposing parallel sides and including an auger disposed therein, wherein said tank includes a mechanized scraping device that includes a plurality of curved structures along the length of said cylindrically shaped tank and disposed on either side of said trough, wherein said curved structures of said scraping device are aligned with the contours of said cylindrically shaped tank and are located at least ½ inch to about 4 inches from the internal surface of said tank and are further aligned to provide a scraping direction substantially perpendicular to the vertical sides of said tank, wherein said scraping device further includes components that direct feed materials toward said trough during utilization thereof; and wherein said auger is provided to maneuver said feed materials to a point of egress at one end of said tank.

2. The feed delivery device of claim 1 wherein the trough includes a means with which controlled introduction of feed materials into said trough is permitted.

3. A method of collecting, transporting, storing, and delivering feed materials therewith through utilization of the device of claim 2.

4. The feed delivery device of claim 1 wherein said device includes a sealable door present on the top of said tank.

5. A method of collecting, transporting, storing, and delivering feed materials therewith through utilization of the device of claim 4.

6. The feed delivery device of claim 1 wherein said device includes at least one spinning device including staggered posts, said spinning device running lengthwise between said two parallel sides of said tank and disposed in such a manner that contact or other obstruction with said scraping device is prevented.

7. A method of collecting, transporting, storing, and delivering feed materials therewith through utilization of the device of claim 6.

8. The feed delivery device of claim 1 wherein said tank includes a trough cover that may be raised or lowered as necessary to meter the amount of feed materials entering said trough.

9. A method of collecting, transporting, storing, and delivering feed materials therewith through utilization of the device of claim 8.

10. The feed delivery device of claim 1 wherein said tank includes bottom openings that lead from said tank to said trough and a movable plate including openings correlating to said bottom openings, wherein said movable plate may be horizontally adjusted along the length of said trough to meter the amount of feed materials entering said trough.

11. A method of collecting, transporting, storing, and delivering feed materials therewith through utilization of the device of claim 10.

12. A method of collecting, transporting, storing, and delivering feed materials therewith through utilization of the device of claim 1.

* * * * *